Figure 2:
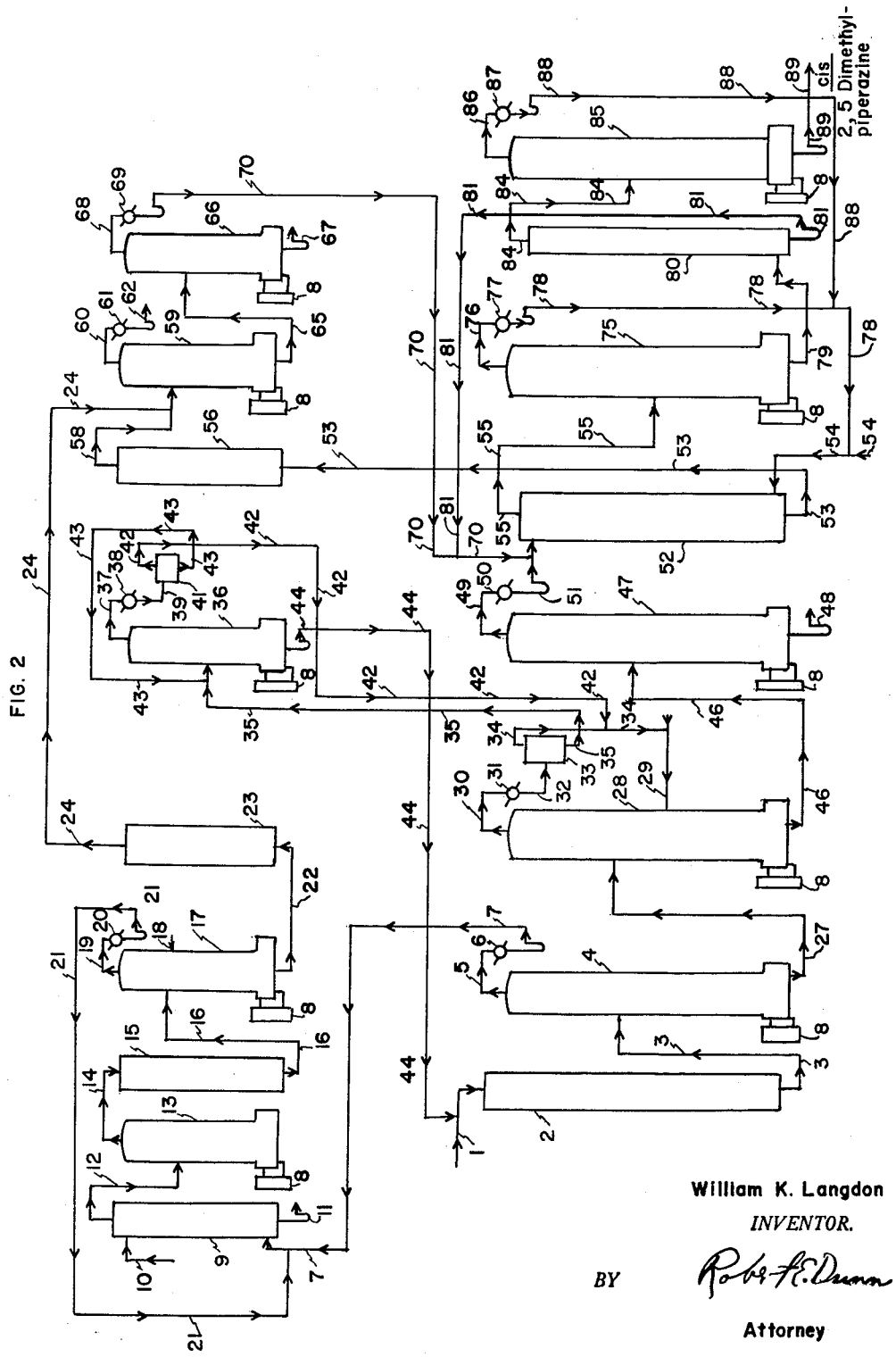

Dec. 4, 1962

W. K. LANGDON 3,067,199

METHOD FOR PREPARING ALKYL-SUBSTITUTED
PIPERAZINES, ALKYL-SUBSTITUTED
PYRAZINES, AND MIXTURES
THEREOF

Filed Sept. 13, 1956

2 Sheets-Sheet 1

William K. Langdon
*INVENTOR.*

BY *Robt. E. Dunn*

Attorney

William K Langdon
INVENTOR.

United States Patent Office 3,067,199
Patented Dec. 4, 1962

3,067,199
METHOD FOR PREPARING ALKYL-SUBSTITUTED PIPERAZINES, ALKYL-SUBSTITUTED PYRAZINES, AND MIXTURES THEREOF
William K. Langdon, Grosse Ile, Mich., assignor to Wyandotte Chemicals Corporation, Wyandotte, Mich., a corporation of Michigan
Filed Sept. 13, 1956, Ser. No. 609,695
8 Claims. (Cl. 260—250)

This invention relates to an improved method for preparing alkyl-substituted piperazines, alkyl-substituted pyrazines, and mixtures of said piperazines and pyrazines. In a more specific aspect, this invention relates to a method for preparing alkyl-substituted piperazines, alkyl-substituted pyrazines, and mixtures thereof, with high conversions and high yields by heating an alkanolamine in the presence of a nickel or cobalt hydrogenation/dehydrogenation catalyst. In a still further aspect, the present invention relates to a method of manufacturing 2,5-dimethyl-piperazine in which isopropanolamine is heated with a nickel or cobalt hydrogenation/dehydrogenation catalyst under critical conditions of time, temperature and hydrogen pressure so as to prepare predominantly trans 2,5-dimethylpiperazine or predominantly cis 2,5-dimethylpiperazine.

This application is a continuation-in-part of my copending applications, Serial No. 361,881, filed June 15, 1953, now abandoned, Serial No. 403,149, filed January 11, 1954, now abandoned, Serial No. 432,686, filed May 27, 1954, now abandoned, Serial No. 575,349, filed April 2, 1956, now abandoned, and Serial No. 527,698, filed August 11, 1955.

Alkyl-substituted piperazines and pyrazines are chemical compounds which are employed as intermediates in the preparation of rubber accelerators, condensation polymers, pharmaceuticals, dyestuffs, and the like. Although the alkyl-substituted piperazines, for example, 2,5-dimethylpiperazine, and alkyl-substituted pyrazines, for example, 2,5-dimethylpyrazine, have many valuable chemical and physical properties, these compounds have only been prepared prior to the present invention by methods which afforded low conversions and yields. Thus, 2,5-dimethylpiperazine has been prepared by reducing 3,6-dimethyl-2,5-diketo-piperazine with sodium. (Hoyer, Z Physiol. Chem., 34, 350 (1902)). 2,5-dimethylpiperazine has also been prepared by the reduction of 2,5-dimethylpyrazine with sodium, see Stoehr, J. Prakt. Chem. (2) 47, 494, 508 (1893), and by the catalytic hydrogenation of lactamide over copper chromite, see Oeda, J. Chem. Soc. Japan, 13, 465—70 (1938). The most recent disclosure in the prior art of a process for preparing a dialkyl-substituted piperazine and which employs an alkanolamine as the starting material is by Bain and Pollard, J. Am. Chem. Soc., 61, 532 (1939), wherein it is disclosed that isopropanolamine in dioxane was heated in the presence of copper chromite at 250–275° C. to yield trans 2,5-dimethylpiperazine. The Bain et al. article does not disclose specifically what conversions were obtained in the reaction. However, Dr. Bain's Doctoral Thesis entitled "Derivatives of Piperazine VIII," 1939, discloses that the yield of trans 2,5-dimethylpiperazine obtained in the reaction disclosed was 18% and that the reaction was carried out in a closed reaction zone, i.e., a "bomb." Such a process does not provide the conversions and yields of dialkyl-substituted piperazines which are necessary in order to make a commercial operation based on this reaction practical. The other prior are processes described hereinabove all suffer from the shortcoming of requiring costly raw materials. It is apparent that there is no teaching in the prior art of a process for preparing alkyl-substituted piperazines, alkyl-substituted pyrazines, or mixtures thereof, which, practically speaking, could be the basis for a commercial operation. Furthermore, there are many applications for 2,5-dimethylpiperazine in which it is either necessary or highly desirable to use either the pure cis or trans isomers. In particular, in the preparation of linear condensation polymers, use of the trans isomer will give a symmetrical polymer of higher melting point than can be obtained through use of either the cis isomer or a mixture of the two isomers. Consequently, there is a need in the art for a process in which isopropanolamine can be converted to predominantly trans 2,5-dimethylpiperazine.

It is, therefore, an object of this invention to provide an improved method for preparing alkyl-substituted piperazines, alkyl-substituted pyrazines and mixtures thereof.

It is a particular object of this invention to provide a method for preparing dialkyl-substituted piperazines and pyrazines with high conversions and yields.

It is a still further object of this invention to provide a process in which isopropanolamine is converted into a product consisting predominantly of trans 2,5-dimethylpiperazine.

Other objects and advantages of this invention will become apparent from the following detailed description thereof.

I have found that alkyl-substituted piperazines, alkyl-substituted pyrazines, and mixtures of said piperazines and pyrazines, can be prepared with high conversions and yields by heating an alkanolamine or mixtures of alkanolamines corresponding to the formula

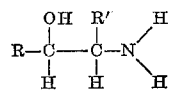

wherein R is a lower alkyl radical and R' is hydrogen or a lower alkyl radical, in the presence of a nickel or cobalt hydrogenation/dehydrogenation catalyst. I have found that under the optimum conditions of temperature, pressure, and catalyst concentration or contact time, alkyl-substituted piperazines and pyrazines are prepared with remarkably high conversions and yields with the reaction being carried out in either liquid or vapor phase. Conversions of up to 70 to 80% and yields of up to about 70 to 85% have been consistently obtained in liquid phase, and conversions of up to about 60% and yields of up to about 69% have been obtained in vapor phase. The remarkably high conversion of the alkanolamine reactant to alkyl-substituted piperazines and pyrazines in the method of my invention makes this process one which is extremely attractive from a commercial point of view. Although high total conversions and yields to both alkyl-substituted piperazines and pyrazines are obtained in either liquid or vapor phase with nickel or cobalt hydrogenation/dehydrogenation catalysts, the production of said piperazines is favored under liquid phase conditions and the production of pyrazines is favored under vapor phase conditions. A batch, liquid phase process of mixing and heating the alkanolamine in the presence of a nickel or cobalt hydrogenation/dehydrogenation catalyst provides the highest conversions and yields to alkyl-substituted piperazines, but high total conversions and yields to alkyl-substituted piperazines and pyrazines are also obtained when the method is carried out continuously by passing the alkanolamine feed in liquid phase or vapor phase over a fixed bed of a supported nickel or cobalt hydrogenation/dehydrogenation catalyst.

It will be noted that the chemical reaction which takes place when an alkanolamine, defined above, is reacted in the presence of a nickel or cobalt hydrogenation/dehydrogenation catalyst can result in two products: an alkyl-substituted piperazine or an alkyl-substituted pyrazine. Under most reaction conditions, both are formed. In the formation of the piperazine, the net chemical reaction is a bimolecular cyclodehydration to give a molecule of the piperazine and two molecules of water. In the formation of the pyrazine the net chemical reaction is the cyclodehydration and dehydrogenation of the alkanolamine to give a molecule of the pyrazine, two molecules of water, and three molecules of hydrogen. It is believed that the first reaction that takes place in the formation of either the piperazine or the pyrazine is the formation of a cyclic Schiff base which may be described as a dihydropyrazine:

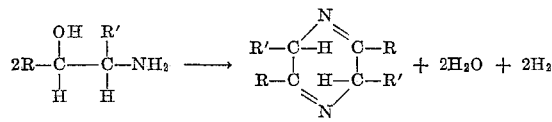

It is believed that a dihydropyrazine structure, such as that shown above, is unstable and, in the presence of the nickel or cobalt hydrogenation/dehydrogenation catalyst used in my process, converts to either a stable pyrazine structure or a stable piperazine structure. It is believed that the former reaction tends to predominate since the elimination of only one additional mol of hydrogen is required to form the dialkyl-substituted pyrazine structure. However, I have found that under certain conditions of the method of the invention, hydrogenation of the Schiff base with two mols of hydrogen occurs to give the stable piperazine structure. The formation of the piperazine structure is favored when fresh nickel or cobalt hydrogenation/dehydrogenation catalysts are used, such as is always the case in the batch process. The use of superatmospheric hydrogen pressure also favors the formation of the piperazine structure. The fact that pyrazines are formed in my process, therefore, is believed to be a truly characterizing feature and distinguishes it from certain intramolecular cyclodehydration reactions in which pyrazines are not formed as co-products.

As was stated above, the starting material in the method of this invention is an alkanolamine corresponding to the formula

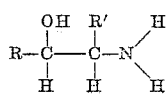

wherein R is a lower alkyl radical and R' is hydrogen or a lower alkyl radical. Thus, alkanolamines can be used in the method of this invention wherein R is an alkyl radical having from 1 to 6 carbon atoms, inclusive, and wherein R' is hydrogen or an alkyl radical having from 1 to 6 carbon atoms, inclusive. I have found that excellent conversions and yields are obtained when isopropanolamine or 1-amino-2-hydroxybutane are used as the starting material. Other alkanolamines which can be used to produce alkyl-substituted piperazines and alkyl-substituted pyrazines are 1-amino-2-hydroxypentane, 1-amino-2-hydroxyhexane, 3-amino-2-butanol, and the like. When isopropanolamine is used as the starting material, 2,5-dimethylpiperazine and 2,5-dimethylpyrazine are the products of the process. When 1-amino-2-hydroxybutane is employed as the starting material, the products of the process are 2,5-diethylpiperazine and 2,5-diethylpyrazine, and when 3-amino-2-butanol is used, the products are 2,3,4,5-tetramethylpiperazine and 2,3,4,5-tetramethylpyrazine.

I have found that high conversions and yields are obtained in the process of this invention when a nickel or cobalt hydrogenation/dehydrogenation catalyst is used. Alloy skeletal nickel and alloy skeletal cobalt catalysts have been found to be particularly effective when the method of the invention is carried out in liquid phase as a batch process. However, the method of the invention can be carried out continuously in liquid or vapor phase when supported nickel or cobalt hydrogenation/dehydrogenation catalysts are employed, and I have found that high conversions and yields are provided when the process is carried out continuously over a nickel supported on kieselguhr hydrogenation/dehydrogenation catalyst. Alloy skeletal nickel catalyst is sold commercially as Raney nickel catalyst, Raney Catalyst Company, Chattanooga, Tennessee, which catalyst is shipped as a suspension under water. Alloy skeletal nickel or cobalt catalysts can be prepared by dissolving aluminum from finely divided nickel-aluminum or cobalt-aluminum alloys, respectively. Supported nickel and cobalt hydrogenation/dehydrogenation catalysts are available commercially. In addition to kieselguhr, nickel and cobalt supported catalysts can be used which employ such materials as silica gel, pumice, and the like, as the support. Illustrative of the supported nickel and cobalt catalysts which give high conversions and yields in the method of the invention are nickel supported on kieselguhr catalysts sold commercially by Harshaw Chemical Company under the code names, "Ni 0104T," "Ni 0107T" and "Co 0102T," the latter being cobalt on a kieselguhr support which is available in a non-reduced form and is reduced immediately before use in the method of the invention.

Supported nickel and cobalt catalysts are commonly prepared by suspending a finely divided inert catalyst support in an aqueous solution of a salt of the nickel or cobalt. Sodium carbonate is then added to provide an insoluble nickel or cobalt carbonate. The resulting slurry is then filtered and thoroughly washed with water to remove all sulfate or chloride ions and dried. The powdered mixture of carbonate and catalyst support is then mixed with a lubricant and a binder, and pressed into pellets or other desired physical form. For an excellent review of the preparation of nickel and cobalt catalysts of the type that can be employed in the present invention, see "Catalysis" by Berkman et al., Reinhold Publishing Company, 330 W. 42nd Street, New York City, pages 253–263, 1940 edition.

It will be apparent from a review of the examples which are included herein that certain nickel and cobalt catalysts under a given set of reaction conditions are more effective in the process of my invention than are other such catalysts. However, the high conversions and yields which are afforded by the mehod of this invention can be obtained with any nickel or cobalt hydrogenation/dehydrogenation catalyst by properly adjusting the conditions affecting the reaction, such as temperature, pressure and reaction time. Alloy skeletal nickel and cobalt are excellent catalysts when the method is carried out as a batch process in liquid phase since high conversions and yields were obtained with these catalysts, although supported nickel or cobalt catalysts can be used. The nickel supported on kieselguhr catalyst sold commercially as "Ni 0104T" was an excellent catalyst when the method was carried out continuously in liquid or vapor phase since high conversions and yields of desired products were obtained when this catalyst was used.

It is believed that the reaction of two molecules of an alkanolamine, corresponding to the formula set forth above, in the method of this invention takes place on the surface of the nickel or cobalt hydrogenation/dehydrogenation catalyst and, therefore, the catalyst concentration or the contact time between reactants and the catalyst bed have little or no effect on the over-all yield, but only upon the reaction rate. The catalyst concentration or contact time can be varied over wide ranges with proper adjustment of temperature and pressure as disclosed herein and high conversions and yields of the desired alkyl-substituted piperazines and alkyl-substituted pyrazines are obtained.

When the alkalolamine employed in the process of the invention is isopropanolamine, the use of a higher reaction temperature, superatmospheric hydrogen pressure and longer reaction time with a nickel or cobalt hydrogenation/dehydrogenation catalyst provides a reaction product consisting predominantly of trans 2,5-dimethylpiperazine. By predominantly trans, I mean a product in which at least 50% of the 2,5-dimethylpiperazine obtained is the trans isomer. Frequently it is possible by this modification of the process of the invention to obtain 2,5-dimethylpiperazine which contains up to about 85% trans isomer. To obtain a product consisting predominantly of trans 2,5-dimethylpiperazine it is essential that the process be carried out at a temperature of at least 180° C., and preferably 200° C. or higher, and under hydrogen pressure of at least 200 p.s.i., and preferably 400 p.s.i. or higher.

When the method is carried out as a batch process, a catalyst concentration of as low as about 0.2 gram of catalyst per mol of alkanolamine starting material is effective in the process. The upper limit on the amount of catalyst used in the batch process is dictated by purely economic considerations. Since it is possible to adjust conditions of temperature, pressure and reaction time to within economical limits and still maintain the catalyst concentration within commercially attractive ranges when said catalyst concentration is between about 0.6 and 2.5 grams of catalyst per mol of the alkanolamine starting material, this range of catalyst concentration is preferred. It is again emphasized that, basically, the invention herein is regarded as being based on the discovery of the high conversions and yields obtained of alkyl-substituted piperazines and alkyl-substituted pyrazines when the defined alkanolamine is heated in the presence of a nickel or cobalt hydrogenation/dehydrogenation catalyst.

The amount of catalyst indicated hereinabove is stated on a "dry" basis, i.e., by taking into account the amount of water present, and the amount of catalyst recited in certain of the claims appended hereto is also on a dry basis. When an alloy skeletal catalyst is used, it is used as a wet catalyst which contains about 45 to 55 weight percent water and the weight of alloy skeletal catalyst reported in the batch process runs herein is on a wet catalyst basis.

The temperature at which the process is carried out, whether in liquid or vapor phase, can also be varied over quite a wide range and still provide high conversions and yields by proper adjustment of the other variables in the process. Thus, a temperature from about 100-260° C. can be used, and I have found that a temperature in the range from about 130-240° C. permits the other variables such as pressure, catalyst concentration and reaction time to be within desirable limits and still afford high conversions and yields. The actual temperature that is uesd to provide any specific conversion and yield will vary with the activity of the catalyst which is employed, also, and temperatures above and below these ranges can be employed as new and improved nickel and cobalt catalysts become available.

When it is desired to conduct the method of the invention in a manner so as to obtain a product containting at least 50% trans dimethylpiperazine using isopropanolamine as the alkanolamine, the reaction temperature has a surprisingly important role in that it has a very pronounced effect on the percent trans isomer obtained in the 2,5-dimethylpiperazine product. When all reaction variables except temperature are held constant, any increase in the reaction temperature leads to an increase in the percent trans isomer obtained in the 2,5-dimethylpiperazine product. As mentioned earlier, in order to obtain over 50% trans dimethylpiperazine, the reaction temperature should be at least 180° C. and preferably 200° C. or higher. In general, the process should be carried out at temperatures below 260° C. and preferably below 240° C.

Similarly, the reaction time can be varied over a wide range. In the batch process when a short reaction time is employed, higher temperatures can be used than when longer reaction times are used and high conversions and yields of the desired products are obtained. A reaction time as short as 0.5 hour has been used when the method of the invention was carried out as a batch process with high conversions and yields, and even shorter reaction times can be used with highly active nickel or cobalt catalysts. The only practical upper limit on reaction time in the batch process is dictated by economic considerations and a reaction time as high as 10 hours has been used. It will be observed from the examples included herein that the high conversions and yields described hereinabove have been obtained throughout the range of reaction times described.

However, when carrying out the method of the invention so as to prepare 2,5-dimethylpiperazine containing over 50% of the trans isomer thereof, reaction time has a very important effect on the ratio of the cis and trans isomers obtained as well as the conversions. Although the precise effect that reaction time has upon the ratio of cis and trans isomers obtained in the process is dependent upon reaction temperature, hydrogen pressure and catalyst concentration, until the reaction conditions are such that the 2,5-dimethylpiperazine product contains about 85% trans isomer any increase in the reaction time of the process will increase the percent trans isomer obtained in the 2,5-dimethylpiperazine product. As a corollary to this observation, the percent trans isomer obtained in the 2,5-dimethylpiperazine product under any given set of reaction conditions will tend to be reduced by shortening the reaction time. The effect of reaction time on the process can be summarized by noting that for any given set of reaction conditions, i.e. temperature, hydrogen pressure and catalyst concentration, there will be a minimum reaction time required to obtain a 2,5-dimethylpiperazine product containing 50% trans isomer. For example a reaction time as short as about 1 to 2 hours can be used in our process with the other conditions of the reaction being within their disclosed ranges. Although the minimum reaction time required to obtain 50% trans isomer in the 2,5-dimethylpiperazine product is dependent upon reaction temperature, hydrogen pressure and catalyst concentrations, the precise time required can be either predicted or determined by a minimum of routine experimentation when the teachings of this application are followed.

The flow rate of the alkanolamine, when the process is carried out continuously in liquid or vapor phase, can be varied over wide ranges. In general, the conversion decreases with increasing rate of flow of the alkanolamine. High conversions and yields of alkyl-substituted piperazines and alkyl-substituted pyrazines are obtained as the rate of flow is decreased so that the only practical lower limit on rate of flow of the alkanolamine is dictated by economic considerations. Generally the alkanolamine is passed over the nickel or cobalt catalyst, when the process is carried out continuously in liquid or vapor phase, at up to about 2.5 mols per 100 grams of catalyst per hour. When the temperature is from about 130–240° C., the rate of flow of alkanolamine is desirably between about 0.2 to 1.0 mols of alkanolamine per 100 grams of catalyst per hour in order to get the best conversions and yields.

It is a feature of the present invention that nickel and cobalt hydrogenation/dehydrogenation catalysts catalyze the reaction of the alkanolamine in either liquid or vapor phase with high total conversions and yields, although the proportion of alkyl-substituted piperazines and alkyl-substituted pyrazines in the reaction products is somewhat altered by differences in conditions employed. The conditions employed when the reaction is carried out continuously in vapor phase favor the formation of alkyl-substituted pyrazines while the conditions employed when the reaction is carried out in liquid phase, and particularly as a liquid phase batch process, favor the formation of alkyl-substituted piperazines.

The main objective of the present invention is to provide a process which affords high conversions and yields to the desired alkyl-substituted piperazines and alkyl-substituted pyrazines, and the conditions for the reaction of this invention all contribute to and cooperate so that such high conversions and yields are possible. Although it is believed that my discovery is basically that high conversions and yields of dialkyl-substituted piperazines and dialkyl-substituted pyrazines are obtained by heating an alkanolamine in the presence of a nickel or cobalt hydrogenation/dehydrogenation catalyst, it is certainly true that in a preferred aspect, the particular conditions which are disclosed herein constitute an important contribution to the prior art. This is especially so in the case where isopropanolamine is employed to prepare a reaction product consisting predominantly of trans 2,5-dimethylpiperazine.

Although the use of inert diluents or solvents is not required in the method of this invention, in contrast to the teaching of Bain et al. referred to hereinabove who employed a dioxane solvent, the reaction of this invention can be carried out in the presence of inert diluents.

Since the reaction of this invention can be carried out in liquid or vapor phase, the pressure that is used can be varied over a wide range, including subatmospheric and superatmospheric pressures. Reduced pressure, that is, atmospheric pressure or below, favors the formation of alkyl-substituted pyrazines and superatmospheric pressure, which can be supplied by any inert gas, favors the formation of alkyl-substituted piperazines. It is desirable to use hydrogen for applying pressure to the process where alkyl-substituted piperazines are particularly desired, since hydrogen pressure favors this result as well as suppressing undesirable side reactions. Hydrogen pressure has been found to have three effects upon the reaction. The first effect is that increasing the hydrogen pressure tends to lower the rate of reaction. A second effect of increasing the hydrogen pressure is to lower the percent alkyl-substituted pyrazines obtained in the reaction. The third effect that is obtained in increasing the hydrogen pressure while maintaining the other variables constant is to increase the percent trans isomer obtained in the 2,5-dimethylpiperazine product when isopropanolamine is used as the alkanolamine starting material.

When the process is carried out in liquid phase, pressures of up to 1200 p.s.i.g. have been used and high conversions and yields were obtained. Higher pressures, such as about 2000 p.s.i.g., or higher, can also be used. A pressure of 200 to 1200 p.s.i.g. is desirable since this permits the adjustment of temperature, catalyst concentration and flow rate of alkanolamine to within commercially desirable limits.

When the process is carried out continuously in vapor phase, the pressure is preferably about atmospheric. The product of the reaction of this invention is a mixture comprising alkyl-substituted piperazines, alkyl-substituted pyrazines and unreacted alkanolamine. The alkyl-substituted pyrazine component is easily removed from the reaction mixture by distilling therefrom as an azeotrope with water. The unreacted alkanolamine which is in the product mixture can be separated from the remaining alkyl-substituted piperazine component by azeotropic distillation with xylene, ethylbenzene or isopropylbenzene as is disclosed and claimed in the copending application of John T. Patton, Jr., Serial No. 395,380, filed December 1, 1953, now abandoned.

The terms "yield" and "conversion" are employed in this specification. Conversion is a measure of the percent of the alkanolamine starting material that is converted to the products of interest, that is, alkyl-substituted piperazines, alkyl-substituted pyrazines and mixtures thereof. Conversion is calculated in accordance with the equation:

Percent Conversion $$=\frac{(2)\times(\text{mols products obtained})\times(100)}{(\text{mols alkanolamine charged})}$$

Yield is calculated on the basis of the alkanolamine starting material which is actually consumed in the reaction of the invention in accordance with the equation:

$$\text{Percent Yield}=\frac{(2)\times(\text{mols product obtained})\times(100)}{(\text{mols alkanolamine charged})-(\text{mols alkanolamine recovered})}$$

The Raney nickel catalyst employed in the examples was supplied by the Raney Catalyst Company, Chattanooga, Tennessee. The alloy skeletal cobalt catalyst used was prepared as set forth hereinabove. The supported nickel catalysts used were nickel supported on kieselguhr, identified as "Ni 0104" and "Ni 0107" supplied by Harshaw Chemical Company, Cleveland, Ohio. The supported catalyst contains approximately 60% of nickel. In certain of the examples, the supported nickel on kieselguhr catalyst was used in a batch process and in this case the catalyst was ground to a fine powder with a mortar and pestle prior to use.

The following examples are set forth to illustrate the method of the invention and should not be used to unduly restrict the scope of the invention as it has been described herein.

EXAMPLE I 450 grams (6 mols) of isopropanolamine and 60 grams of finely ground Ni 0104 catalyst were charged into a three-neck flask equipped with a stirrer, thermometer and distillation head. The mixture was heated so as to maintain a slow rate of distillation and both the pot and head temperature steadily rose until at the end of the reaction, the pot temperature was 165° C. and the head temperature was 140° C. When the pot temperature reached 125° C. (head temperature 96° C.) there was a definite evolution of gas that smelled of ammonia. This gas was collected over a dilute hydrochloric acid solution and proved to be mostly hydrogen. After approximately two hours, the distillation was stopped and the fractions containing isopropanolamine and product were combined with the undistilled reaction product that had been filtered free of catalyst.

A small quantity of water was added to the reaction mixture and 2,5-dimethylpyrazine was distilled therefrom as an azeotrope with water. The water was then removed from the dimethylpyrazine by azeotropic distillation with benzene and 26 grams of 2,5-dimethylpyrazine was collected that distilled mainly at 152–153° C. The conversion to 2,5-dimethylpyrazine was 8% of the isopropanolamine charged.

300 grams of xylene was added to the residue from the above described distillation and all of the isopropanolamine was removed therefrom as a xylene-isopropanolamine azeotrope that boiled at 131–133° C. The remaining xylene was then removed and 152 grams of 2,5-dimethylpiperazine was collected at a temperature of 161–163° C. After correcting for minor handling losses in filtration, this amount of 2,5-dimethylpiperazine corresponded to a conversion of 50%. The total conversion of isopropanolamine to both 2,5-dimethylpiperazine and 2,5-dimethylpyrazine was 58%.

EXAMPLE II

A series of liquid phase, batch process runs was made with different types of nickel and cobalt hydrogenation/dehydogenation catalysts in the reaction of this invention. These runs are summarized below in Table 1. In each of the runs an amount of catalyst and isopropanolamine sufficient to provide the indicated catalyst concentration in grams per mol of isopropanolamine were charged into a stainless steel autoclave fitted with a stirrer, internal cooling coils and a hydrogen inlet. The stirrer in the autoclave was started and air was displaced by purging with nitrogen and then hydrogen. In Runs 1, 2, 3 and 4 the pressure was that developed autogeneously during the heating period after about 50 p.s.i.g. of hydrogen remained in the autoclave initially at room temperature and the reported pressures are those at the beginning and end of the reaction period at 146° C. In Run 5, after initially purging the autoclave, the autoclave was then pressured to approximately the desired pressure with hydrogen and the contents heated rapidly (usually about 30 minutes) to the desired temperature. The pressure range reported in Run 5 was that maintained by either venting or adding hydrogen to the autoclave. The contents of the autoclave were then stirred for the time and at the temperature and pressure indicated in Table 1.

In Runs 1, 2, 3 and 4 the catalyst was filtered from the reaction mixture at the end of the time indicated and the products, 2,5-dimethylpiperazine and 2,5-dimethylpyrazine were recovered in the manner described above in connection with Example I. In Run 5, an aliquot portion of the filtered crude reaction product was distilled in a 0.9 x 120 cm. nichrome spiral-packed glass distillation column and a sample of the distillate boiling in the range of 93–165° C. was submitted for analysis. The percent conversion to 2,5-dimethylpiperazine, to 2,5-dimethylpyrazine and total thereof, and total percent yield to these products are shown in Table 1:

Table 1

| Run No. | Catalyst | Catalyst concentration, g./mol | Time, hours | Temp., °C. | Pressure, p.s.i.g. | Conversion, DMP,[1] percent | Conversion, DMPy,[2] percent | Total conversion, percent | Total yield, percent |
|---|---|---|---|---|---|---|---|---|---|
| 1 | Raney Ni | a 10 | 6 | 146 | 210 | 51 | 2 | 53 | 71 |
| 2 | do | a 5 | 4 | 146 | 220 | 45 | Neg. | 45 | 73 |
| 3 | Ni 0104 [3] | b 5 | 4 | 146 | 220–240 | 31 | 1.6 | 32.6 | 58 |
| 4 | Ni 0107 [3] | b 5 | 4 | 146 | 202–295 | 19 | 1.8 | 20.8 | 59 |
| 5 | Cobalt [4] | a 2.5 | 4 | 180 | 200–250 | 60 | 10 | 70 | 78 |

[1] 2,5-dimethylpiperazine.
[2] 2,5-dimesylpyrazine.
[3] Catalyst ground to fine powder with a mortar and pestle.
[4] Alloy skeletal cobalt.
a Weight of catalyst on a wet catalyst basis.
b Weight of catalyst on a dry catalyst basis.

It will be apparent from an inspection of the data in Table 1 above that an excellent catalyst in the batch process of this invention is an alloy skeletal nickel or cobalt catalyst. It is to be noted again that one of the main objectives of this invention is to provide both high conversions and yields of product. Alloy skeletal nickel and cobalt gave the best results in the runs summarized above, although even better results have been obtained under slightly different conditions within the scope of this invention, these runs being reported in the examples to follow.

EXAMPLE III

The series of runs in this example demonstrates the ranges of temperature, pressure, catalyst concentration and time which can be used in the batch process of this invention and demonstrates the effect of variation of these variables on the conversion and yield obtained. These runs all were carried out with Raney nickel as the catalyst and isopropanolamine as the starting material. The runs were carried out in the stainless steel autoclave described in Example II and in each case, after purging the autoclave with nitrogen and hydrogen, hydrogen gas was charged to the autoclave to the desired operating pressure at room temperature. The autoclave was then heated rapidly (30 minutes) to the desired temperature and the pressure on the system at the reaction temperature was maintained by either venting or adding hydrogen gas as was required.

The method followed in working up the reaction product was first to remove 2,5-dimethylpyrazine as a water azeotrope that boils at about 98° C. by distillation through either a 2.8 cm. x 120 cm. helice-packed distillation column or a 0.9 cm. x 120 cm. Podielniak-type distillation column. Usually sufficient water was already present in the reaction mixture for carrying out the water-2,5-dimethylpyrazine azeotropic distillation, but in case where large amounts of 2,5-dimethylpyrazine were produced, more water was added to facilitate the azeotropic distillation.

The yield of 2,5-dimethylpyrazine was determined by ultraviolet absorption of the aqueous forerun at 275 mu wavelength. After 2,5-dimethylpyrazine was removed by azeotropic distillation, remaining water in the crude reaction product was collected until the temperature rose to about 101° C. An intermediate fraction was then taken until the head temperature reached 155° C. The 2,5-dimethylpiperazine fraction was then collected at a temperature of 165–170° C. At this point the head temperature dropped and the pot temperature was about 250° C.

The 2,5-dimethylpiperazine fraction consisted of both cis and trans 2,5-dimethylpiperazine and unreacted isopropanolamine. The isopropanolamine and 2,5-dimethylpiperazine have different titration curves and the percent unreacted isopropanolamine in the mixture was determined from titration curves by the use of suitable quadratic equations. Ultimately, the percentage of cis and trans isomers in the 2,5-dimethylpiperazine product were determined by infrared analysis from standards prepared from pure samples of the two isomers.

Unreacted isopropanolamine was removed from the 2,5-dimethylpiperazine product fraction by azeotropic distillation with ethylbenzene. About 20–40% of the 2,5-dimethylpiperazine was the amount of ethylbenzene added and the isopropanolamine was removed as an ethylbenzene azeotrope at about 131° C.

The results of these runs are summarized in Table 2:

grams per mol of isopropanolamine that were used. Expressed on a dry catalyst basis, as low as about 0.2 gram of alloy skeletal nickel or cobalt catalyst per mol of an alkanolamine coming within the formula set forth hereinabove can be used when the method of the invention is carried out as a batch, liquid phase process, and high conversions and yields comparable to those obtained in these runs are obtained.

Similarly, the time for reaction when the method of the invention is carried out as a batch, liquid phase process can be varied widely, and Runs 14, 15 and 16, as well as Runs 6 and 10, demonstrate reaction times that were used. It will be noted that the time employed ranged from 0.5 hour to 8 hours. However, if the use of low temperatures, and/or low catalyst concentrations is desired, larger reaction times can be used, and if the use of high temperatures and/or high catalyst concentrations is desired, reaction times of shorter than 30 minutes can be employed.

As has been pointed out heretofore, a feature of the method of this invention is the provision of a process for producing a 2,5-dimethylpiperazine product, employing isopropanolamine as the alkanolamine starting material, wherein at least 50% thereof is the trans isomer of 2,5-dimethylpiperazine. The conditions under which this has been accomplished are regarded as one of the most important contributions of this invention. These conditions and the remarkable success in obtaining a high percent of the trans isomer are illustrated in the following Example IV.

EXAMPLE IV

One hundred and twenty pounds of isopropanolamine

*Table 2*

Batch Process Isopropanoline-Raney Ni Catalyst

| Run No. | Catalyst concentration,[1] g./mol IPA[2] | Time, hours | Temp., °C. | Pressure, p.s.i.g. | Conversion DMP,[3] percent | Conversion DMPy,[4] percent | Total Conversion, percent | Total yield, percent | Percent trans isomer in DMP[3] |
|---|---|---|---|---|---|---|---|---|---|
| 1 | 10 | 4 | 136 | 195 | 33 | Neg. | 33 | 49 | |
| 2 | 5 | 4 | 146 | 220 | 45 | Neg. | 45 | 73 | |
| 3 | 2.5 | 4 | 160 | 200 | 50 | 5 | 55 | 68 | 35 |
| 4 | 2.5 | 4 | 180 | 400 | 61 | 3 | 64 | 82 | 40 |
| 5 | 2.5 | 4 | 200 | 400 | 62 | 6 | 68 | 73 | 34 |
| 6 | 2.5 | 0.5 | 220 | 1,200 | 56 | 6 | 62 | 75 | 44 |
| 7 | 2.5 | 4 | 180 | 200 | 63 | 9 | 72 | 79 | 26 |
| 8 | 2.5 | 4 | 180 | 800 | 60 | 1 | 61 | 78 | 42 |
| 9 | 1.25 | 4 | 220 | 800 | 64 | 6 | 70 | 75 | 44 |
| 10 | 2.5 | 4 | 220 | 400 | 67 | 9 | 76 | 76 | 41 |
| 11 | 5.0 | 4 | 180 | 200 | 65 | 8 | 73 | 77 | 28 |
| 12 | 10.0 | 5.5 | 146 | 210 | 51 | Neg. | 51 | 68 | |
| 13 | 2.5 | 8 | 180 | 200 | 70 | 10 | 80 | 83 | 27 |
| 14 | 2.5 | 6 | 180 | 200 | 55 | 14 | 69 | 74 | 28 |
| 15 | 5.0 | 8 | 180 | 200 | 67 | 8 | 75 | 77 | 31 |

[1] Isopropanolamine.  [2] 2,5-dimethylpiperazine.  [3] 2,5-dimethylpyrazine.  [4] Wet catalyst basis.

Although temperatures in the range from 100–260° C. can be used in the process of the invention, Run Nos. 1 through 6 in Table 2 demonstrate the range of temperature at which the method of this invention gives the best results. The highest conversions and yields are obtained in the temperature range of 130–240° C., which temperature range is preferred in the method of this invention.

The process of this invention can be carried out over a wide range of pressures, and Runs 7 and 8, as well as Runs 1, 5 and 6 demonstrate desirable pressures at which the method of this invention can be carried out in liquid phase. High conversions and yields were obtained at pressures throughout the range from 200–1200 p.s.i.g.

The amount of catalyst used when the method of the invention is carried out in liquid phase can vary over a wide range, also, and Runs 9, 10, 11 and 12 demonstrate ranges of catalyst concentration (wet catalyst basis) in and four pounds of Raney nickel (added as a 50% aqueous slurry) were charged to a 25 gallon autoclave. All oxygen was displaced from the reactor with hydrogen and the reaction mixture was heated for 6 hours at 220° C. under 1200 pounds hydrogen pressure. The product contained 70 pounds of 2,5-dimethylpiperazine which represented a conversion of 76% on the isopropanolamine charged. The 2,5-dimethylpiperazine consisted of 83% trans isomer and only 17% cis isomer. Only about 0.5 pound of 2,5-dimethylpiperazine was obtained.

EXAMPLE V

A series of runs was made following the procedure of Example III employing isopropanolamine and Raney nickel catalyst to demonstrate the effect of changes in reaction time, temperature, catalyst concentration and hydrogen pressure on the amount of the trans isomer of 2,5- dimethylpiperazine obtained in accordance with the invention. The results of these runs are summarized in Table 3:

Table 3

Effect of Reaction Conditions on Percent Trans 2,5-Dimethylpiperazine Obtained Batch Process-Isopropanolamine-Raney Ni Catalyst

| Run No. | Catalyst concentration,[1] g./mol IPA[2] | Time, hours | Temp., °C. | Pressure, p.s.i.g. | Conversion DMP[3] percent | Conversion DMPy,[4] percent | Total conversion, percent | Percent trans |
|---|---|---|---|---|---|---|---|---|
| 1 | 2.5 | 4 | 220 | 800 | 66 | 2 | 68 | 50 |
| 2 | 2.5 | 8 | 220 | 800 | 70 | 2 | 72 | 61 |
| 3 | 2.5 | 16 | 220 | 800 | 72 | 2 | 74 | 76 |
| 5 | 2.5 | 4 | 180 | 800 | 60 | 1 | 61 | 42 |
| 6 | 2.5 | 4 | 200 | 800 | 61 | 2 | 63 | 46 |
| 7 | 2.5 | 4 | 240 | 800 | 65 | 6 | 71 | 75 |
| 8 | 1.25 | 4 | 220 | 800 | 64 | 6 | 70 | 44 |
| 9 | 5.0 | 4 | 220 | 800 | 73 | 2 | 75 | 73 |
| 10 | 2.5 | 4 | 220 | 1,200 | 71 | 1 | 72 | 58 |
| 11 | 3.7 | 4 | 220 | 1,200 | 77 | 2 | 79 | 75 |
| 12 | 5.0 | 4 | 220 | 1,200 | 77 | 1 | 78 | 80 |
| 13 | 2.5 | 4 | 180 | 200 | 63 | 9 | 72 | 26 |
| 14 | 2.5 | 4 | 180 | 400 | 61 | 3 | 64 | 40 |
| 15 | 2.5 | 4 | 200 | 200 | [5]44 | [5]17 | [5]61 | 31 |
| 16 | 2.5 | 4 | 200 | 400 | 62 | 6 | 68 | 34 |
| 17 | 2.5 | 4 | 200 | 800 | 61 | 2 | 63 | 46 |
| 18 | 2.5 | 4 | 220 | 400 | 67 | 9 | 76 | 41 |

[1] Wet catalyst basis.
[2] Isopropanolamine.
[3] 2,5-Dimethylpiperazine.
[4] 2,5-Dimethylpyrazine.
[5] Results too low, probably due to handling and/or venting losses.

Runs 1, 2 and 3 in Table 3 show the effect of increasing the reaction time while holding the other variables constant. It will be observed that increasing the reaction time from 4 to 16 hours had only a small effect in increasing the total conversion of isopropanolamine to the desired products, thus indicating the reaction was essentially complete at the end of 4 hours. However, increasing the reaction time had a marked effect upon the percentage of the trans isomer obtained in the 2,5-dimethylpiperazine product, which percentage increased from 50% to 76%. This effect of reaction time in increasing the percentage of trans isomer obtained has been observed under widely varying conditions of temperature, hydrogen pressure and catalyst concentration.

Runs 5, 6 and 7 in Table 3 show the marked increase in the percent trans isomer obtained in the 2,5-dimethylpiperazine product when the reaction temperature is increased with the other variables held constant. Also, the total conversion obtained increased, thus showing the effect that increasing the reaction temperature has on increasing the rate of reaction.

Since it is probable that the reaction of the invention takes place on the surface of the catalyst, the effect of increasing the catalyst concentration in a batch-type system (or the contact time in a continuous system) is to increase the amount of material reacted per unit of time. Thus, the effect of increasing the catalyst concentration is similar to the effect noted in increasing the reaction time or the reaction temperature, i.e., the percentage of the trans isomer in the 2,5-dimethylpiperazine product is increased. This is shown by Runs 8 and 9 and by Runs 10, 11 and 12 in Table 3.

As was mentioned hereinbefore, hydrogen pressure has been found to have three effects on the method of the invention. Runs 13, 14 and 5 in Table 3 and Runs 18, 1 and 10 in Table 3 show that increasing the hydrogen pressure results in lowering of the total conversion of 2,5-dimethylpiperazine and 2,5-dimethylpyrazine. In these runs the total conversion dropped from 72% to 61% when the hydrogen pressure was increased from 200 to 800 p.s.i. A second effect of increasing the hydrogen pressure is to decrease the percent of 2,5-dimethylpyrazine obtained which is also shown by Runs 13, 14 and 5 in Table 3 where the percent 2,5-dimethylpyrazine dropped from 9 to 1 as the hydrogen pressure increased from 200 to 800 p.s.i., and by Runs 15, 16 and 17 and Runs 18, 1 and 10 where comparable results were obtained. The third effect which results from increasing the hydrogen pressure, and a most important feature of this invention, is that the percentage of the trans isomer of 2,5-dimethylpiperazine increases when the hydrogen pressure is increased. A comparison of Runs 13, 14 and 5, Runs 15, 16 and 17, and Runs 18, 1 and 10 in Table 3 show this result was consistently obtained.

EXAMPLE VI

A run was carried out wherein butanolamine (1-amino-2-hydroxybutane) was reacted in the method of the invention so as to produce 2,5-diethylpiperazine and 2,5-diethylpyrazine. The method employed was that described for the runs in Example III. Raney nickel catalyst was employed and the concentration of catalyst used was 5 grams per mol of butanolamine. The run was carried out at 180° C. for 4 hours while maintaining a pressure of from 200–225 p.s.i.g. The autoclave was initially pressured to 50 p.s.i.g. with hydrogen and vented as was required so as to maintain the indicated pressure at the operating temperature.

44% conversion to 2,5-diethylpiperazine and 10% conversion to 2,5-diethylpyrazine, making a total of 54% conversion to the desired products, was obtained. A yield of 52% to 2,5-diethylpiperazine and 12% to 2,5-diethylpyrazine was obtained, thereby providing a total yield of 64% to the desired products.

The 2,5-diethylpiperazine was recovered by distillation in the workup of the reaction product as described for the runs in Example III and boiled at from 193–200° C. The 2,5-diethylpyrazine fraction boiled from 187–188° C.

In recovering the products of the reaction, the 2,5-diethylpyrazine was first separated by distillation as an azeotrope with water. Thereafter, the remaining reaction mixture was completely distilled in a 2.8 x 120 cm. helic-packed glass column.

The results of this run and of the other runs in this application demonstrate that alkanolamines coming with the formula

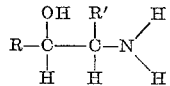

wherein R is a lower alkyl radical, preferably wherein R is an alkyl radical having from 1 to 6 carbon atoms, inclusive, and wherein R' is hydrogen or an alkyl radical as defined for R, can be reacted in the method of this invention to provide alkyl-substituted piperazines and pyrazines with high conversions and yields.

EXAMPLE VII

The following series of runs demonstrates the method of the invention when it is carried out on a continuous basis under varying conditions of temperature and pressure.

Run 1 is summarized below in Table 4. In this run isopropanolamine was trickled downwardly through a bed of pelleted Ni 0104 catalyst. The reactor containing the catalyst was a 1-inch I.D. stainless steel tube encased in a Dowtherm-heated jacket. The catalyst bed was 18 inches in length and weighed 310 grams. A 12-inch section of the reactor immediately above the catalyst bed was packed with small Berl saddles to serve as a preheater for the isopropanolamine charge. Hydrogen gas was admitted to the reactor so as to maintain the indicated pressure on the system.

The results of Run 1 are summarized below in Table 4:

Table 4

| Sample No. | Sample time, hrs. on stream | | Conditions | | | Conversion of IPA,[3] percent to— | | | Yield, percent DMP+DMPy |
|---|---|---|---|---|---|---|---|---|---|
| | Start | End | Press., p.s.i.g. | Temp., °C. | Feed, ml./hr. | DMP[1] | DMPy[2] | DMP+DMPy | |
| 1 | 3 | 5 | 50 | 130 | 150 | 32 | 0.9 | 33 | 70 |
| 2 | 6 | 9 | 200 | 130 | 150 | 21 | 0.2 | 21 | 67 |
| 3 | 17 | 23 | 50 | 130 | 75 | 44 | 1 | 45 | 78 |
| 4 | 26 | 32 | 50 | 150 | 75 | 64 | 7 | 71 | 81 |
| 5 | 37 | 43 | 200 | 150 | 75 | 47 | 1 | 48 | 71 |
| 6 | 53 | 56 | 50 | 150 | 150 | 55 | 7 | 62 | 76 |
| 7 | 57 | 59 | 50 | 165 | 150 | 62 | 15 | 77 | 77 |
| 8 | 59 | 61 | 50 | 180 | 150 | 50 | 30 | 80 | 80 |

[1] 2,5-dimethylpiperazine.   [2] 2,5-dimethylpyrazine.   [3] Isopropanolamine.

Run 2 shows the method of the invention in a continuous process when the conditions of temperature and pressure were varied over wider limits. The procedure and reactants employed were the same as that described for Run 1 in this example. The results of Run 2 are summarized below in Table 5:

Table 5

| Sample No. | Sample time, hrs. on stream | | Conditions | | | Conversion of IPA,[3] percent to— | | | Yield, percent DMP+DMPy |
|---|---|---|---|---|---|---|---|---|---|
| | Start | End | Press., p.s.i.g. | Temp., °C. | Feed, ml./hr. | DMP[1] | DMPy[2] | DMP+DMPy | |
| 1 | 3 | 5 | 100 | 150 | 150 | 56 | 3 | 59 | 77 |
| 2 | 7 | 9 | 300 | 150 | 150 | 42 | 1 | 43 | 68 |
| 3 | 11 | 13 | 500 | 150 | 150 | 35 | 1 | 36 | 62 |
| 4 | 15 | 17 | 800 | 150 | 150 | 37 | 0 | 37 | 63 |
| 5 | 21 | 23 | 100 | 165 | 150 | 61 | 20 | 81 | 83 |
| 6 | 25 | 27 | 300 | 165 | 150 | 39 | 6 | 45 | 66 |
| 7 | 29 | 31 | 500 | 165 | 150 | 34 | 4 | 38 | 65 |
| 8 | 33 | 35 | 800 | 165 | 150 | 30 | 3 | 33 | 61 |
| 9 | 39 | 41 | 100 | 180 | 150 | 36 | 37 | 73 | 74 |
| 10 | 43 | 45 | 300 | 180 | 150 | 39 | 17 | 56 | 70 |
| 11 | 47 | 49 | 500 | 180 | 150 | 42 | 13 | 55 | 72 |
| 12 | 51 | 53 | 800 | 180 | 150 | 31 | 7 | 38 | 68 |
| 13 | 57 | 59 | 100 | 200 | 150 | 18 | 45 | 63 | 68 |
| 14 | 61 | 63 | 300 | 200 | 150 | 29 | 39 | 68 | 72 |
| 15 | 65 | 67 | 500 | 200 | 150 | 34 | 31 | 65 | 68 |
| 16 | 69 | 71 | 800 | 200 | 150 | 35 | 22 | 57 | 70 |
| 17 | 72 | 74 | 800 | 220 | 150 | 37 | 25 | 62 | 65 |

(1) 2,5-dimethylpiperazine.   (2) 2,5-dimethylpyrazine.   (3) Isopropanolamine.

Run 3 was carried out employing Ni 0107. The amount of catalyst, the reactor and general operating procedure were the same as in Runs 1 and 2 in this example. Isopropanolamine was the starting material and the results of Run 3 are summarized below in Table 6:

Table 6

| Sample No. | Sample time, hrs. on stream | | Reaction conditions | | Feed rate, ml./hr. | Conversion, percent to— | | | Yield, percent to— | | |
|---|---|---|---|---|---|---|---|---|---|---|---|
| | Start | End | Press., p.s.i.g. | Temp., °C. | | DMP[1] | DMPy[2] | Total | DMP | DMPy | Total |
| 1 | 0 | 3.0 | 200 | 130 | 150 | 14 | | 14 | 59 | 1 | 60 |
| 2 | 4.5 | 7.5 | 50 | 150 | 150 | 56 | 4 | 60 | 72 | 5 | 77 |
| 3 | 8.0 | 11.0 | 200 | 150 | 150 | 25 | 1 | 26 | 64 | 1 | 65 |
| 4 | 11.5 | 14.5 | 300 | 150 | 150 | 21 | | 21 | 64 | 1 | 65 |
| 5 | 16.0 | 19.0 | 50 | 175 | 150 | 55 | 19 | 74 | 57 | 19 | 76 |
| 6[(3)] | 20.0 | 22.0 | 50 | 175 | 150 | 53 | 19 | 72 | 53 | 19 | 72 |
| 7 | 25.0 | 27.5 | 200 | 175 | 150 | 46 | 7 | 53 | 62 | 9 | 71 |
| 8 | 28.5 | 31.5 | 300 | 175 | 150 | 39 | 6 | 45 | 61 | 9 | 70 |
| 9 | 34.5 | 37.5 | 50 | 200 | 150 | 29 | 38 | 67 | 30 | 39 | 69 |
| 10 | 38.5 | 41.5 | 200 | 200 | 150 | 40 | 27 | 67 | 40 | 27 | 67 |
| 11 | 42.5 | 45.5 | 300 | 200 | 150 | 46 | 22 | 68 | 48 | 23 | 71 |
| 12 | 47.0 | 50.0 | 50 | 225 | 150 | 18 | 44 | 62 | 21 | 50 | 71 |
| 13 | 50.5 | 53.5 | 200 | 225 | 150 | 22 | 38 | 60 | 22 | 38 | 60 |
| 14 | 54 | 57 | 300 | 225 | 150 | 23 | 40 | 63 | 23 | 40 | 63 |

[1] 2,5-dimethylpiperazine.  [2] 2,5-dimethylpyrazine.  [3] Feed rate 75 ml./hr.

EXAMPLE VIII

A run was carried out in the continuous process employing 310 grams of Ni 0104 catalyst in a 1″ x 18″ tube and isopropanolamine and shows the effect of catalyst ageing and the effect of increasing temperature. The reaction was carried out in the equipment described in Example VII, the pressure was maintained at 100 p.s.i.g., and the feed rate of isopropanolamine at 150 ml. per hour. The temperature was raised in 10-degree increments from 150 to 200° over a run of 480 hours, at the end of which time the total conversion to dialkyl-substituted piperazine and dialkyl-substituted pyrazine was 47% and the total yield to these products was 68%. The results of this run are summarized below in Table 7:

Table 7

| Sample No. | Temp., °C. | Sample time, hrs. on stream | | Conversion of IPA,[1] percent to— | | | Yield, percent DMP+DMPy |
|---|---|---|---|---|---|---|---|
| | | Start | End | DMP[2] | DMPy[3] | DMP—DMPy | |
| 1 | 150 | 0 | 96 | 39 | 5 | 44 | 72 |
| 2 | 160 | 96 | 160 | 28 | 14 | 42 | 73 |
| 3 | 170 | 160 | 276 | 22 | 23 | 45 | 75 |
| 4 | 180 | 276 | 312 | 19 | 27 | 46 | 74 |
| 5 | 190 | 312 | 402 | 15 | 34 | 49 | 73 |
| 6 | 200 | 402 | 480 | 12 | 35 | 47 | 68 |

[1] Isopropanolamine.  [2] 2,5-dimethylpiperazine.  [3] 2,5-dimethylpyrazine.

EXAMPLE IX

Two further runs were carried out under essentially complete conversion conditions using isopropanolamine as the starting material and Ni 0104 as the catalyst in Run 1 and Ni 0107 as the catalyst in Run 2. The amount of catalyst was 310 grams in a 1″ x 18″ tube. The feed rate was held at 150 ml. per hour in each run and the pressure used was that which was deemed necessary to maintain a liquid state in the reactor. The temperature was raised during the course of the run to maintain high conversions and the pressure was also increased two pounds per degree centigrade increase in temperature. In Run 1 employing Ni 0104 as the catalyst the reaction was carried out continuously for 278 hours and the conversion of isopropanolamine to dialkyl-substituted piperazine and dialkyl-substituted pyrazine varied from 68—73%. The results of Run 1 are summarized in Table 8:

Table 8

| Sample No. | Sample time, hrs. on stream | | Conditions | | Conversion of IPA[1] percent to— | | |
|---|---|---|---|---|---|---|---|
| | Start | End | Press., p.s.i.g. | Temp., °C. | DMP[2] | DMPy[3] | DMP+DMPy |
| 1 | 0 | 14 | 30 | 165 | 53 | 20 | 73 |
| 2 | 14 | 31 | 40 | 170 | 52 | 18 | 70 |
| 3 | 31 | 47 | 50 | 175 | 49 | 21 | 70 |
| 4 | 47 | 63 | 50 | 175 | 49 | 22 | 71 |
| 5 | 63 | 69 | 50 | 175 | 47 | 25 | 72 |
| 6 | 69 | 86 | 60 | 180 | 45 | 27 | 72 |
| 7 | 86 | 110 | 60 | 180 | 43 | 28 | 71 |
| 8 | 110 | 134 | 60 | 180 | 41 | 28 | 69 |
| 9 | 134 | 158 | 60 | 180 | 38 | 31 | 69 |
| 10 | 158 | 182 | 70 | 185 | 38 | 34 | 72 |
| 11 | 182 | 206 | 70 | 185 | 34 | 35 | 69 |
| 12 | 206 | 230 | 70 | 185 | 32 | 38 | 70 |
| 13 | 230 | 254 | 80 | 190 | 30 | 40 | 70 |
| 14 | 254 | 278 | 80 | 190 | 27 | 41 | 68 |

[1] Isopropanolamine.  [2] 2,5-dimethylpiperazine.  [3] 2,5-dimethylpyrazine.

In Run 2, Ni 0107 was used and, after carrying out the reaction for 278 hours, the conversion had varied from 59% to 71%. The results of Run 2 are summarized below in Table 9:

that either cis or trans 2,5-dimethylpiperazine can be converted or isomerized to the other by heating in the presence of nickel hydrogenation/dehydrogenation catalysts as illustrated in the reactions below:

*Table 9*

| Sample No. | Sample time, hrs. on stream | | Conditions | | Conversion of IPA [1] percent to— | | |
|---|---|---|---|---|---|---|---|
| | Start | End | Press., p.s.i.g. | Temp., °C. | DMP [2] | DMPy [3] | DMP+DMPy |
| 1 | 0 | 14 | 50 | 175 | 43 | 27 | 70 |
| 2 | 14 | 31 | 60 | 180 | 40 | 29 | 69 |
| 3 | 31 | 47 | 70 | 185 | 36 | 32 | 68 |
| 4 | 47 | 63 | 70 | 185 | 33 | 38 | 71 |
| 5 | 63 | 86 | 70 | 185 | 29 | 38 | 67 |
| 6 | 86 | 110 | 80 | 190 | 27 | 42 | 69 |
| 7 | 110 | 134 | 90 | 195 | 23 | 43 | 66 |
| 8 | 134 | 158 | 100 | 200 | 20 | 46 | 66 |
| 9 | 158 | 183 | 120 | 210 | 18 | 48 | 66 |
| 10 | 183 | 207 | 140 | 220 | 16 | 46 | 62 |
| 11 | 207 | 230 | 140 | 220 | 16 | 48 | 64 |
| 12 | 230 | 254 | 160 | 230 | 14 | 45 | 59 |
| 13 | 254 | 278 | 160 | 230 | 13 | 46 | 59 |

[1] Isopropanolamine.   [2] 2,5-dimethylpiperazine.   [3] 2,5-dimethylpyrazine.

EXAMPLE X

A series of runs was made wherein the method of this invention was carried out at atmospheric pressure under vapor phase conditions. These runs are summarized below in Table 10.

Isopropanolamine was passed over 200 grams of the indicated catalyst contained in a 100 cm. section of 18 mm. I.D. glass tubing. A section of inert packing was placed in the tubing upstream of the catalyst bed to serve as a preheater section so as to vaporize the isopropanolamine feed before it contacted the catalyst.

The products were separated from the reaction mixture by fractional distillation as previously described.

(A) Trans 2,5-dimethylpiperazine $$\xrightarrow[\Delta]{Ni}$$

cis-dimethylpiperazine (B) Cis 2,5-dimethylpiperazine $$\xrightarrow[\Delta]{Ni}$$

trans 2,5-dimethylpiperazine

*Table 10*

| Run No. | Catalyst | Temp., °C. | Feed rate, grams per gram catalyst per hour | Conversion to DMP,[1] Percent | Conversion to DMPy,[2] Percent | Total conversion to DMP and DMPy, Percent | Total yield to DMP and DMPy, Percent |
|---|---|---|---|---|---|---|---|
| 1 | UOP Ni [3] | 175 | 1.0 | 24 | 26 | 50 | 69 |
| 2 | UOP Ni | 200 | 0.5 | 18 | 36 | 54 | 59 |
| 3 | UOP Ni | 200 | 1.0 | 21 | 40 | 61 | 64 |
| 4 | UOP Ni | 200 | 1.5 | 15 | 18 | 33 | 69 |
| 5 | UOP Ni | 225 | 0.5 | 6 | 46 | 52 | 54 |
| 6 | UOP Ni | 225 | 1.0 | 10 | 41 | 51 | 56 |
| 7 | UOP Ni | 225 | 1.5 | 11 | 35 | 46 | 60 |
| 8 | UOP Ni | 250 | 0.5 | 5 | 35 | 40 | 40 |
| 9 | UOP Ni | 250 | 1.0 | 3 | 40 | 43 | 44 |
| 10 | UOP Ni | 250 | 1.5 | 6 | 45 | 51 | 54 |
| 11 | Ni 0107 [4] | 175 | 1.0 | 22 | 33 | 55 | 57 |
| 12 | Ni 0107 | 200 | 1.0 | 14 | 35 | 49 | 55 |
| 13 | Ni 0107 | 225 | 1.0 | 3 | 45 | 48 | 48 |
| 14 | Ni 0104 [4] | 200 | 1.0 | 11 | 52 | 63 | 65 |
| 15 | Ni 0104 | 225 | 1.0 | 5 | 41 | 46 | 48 |
| 16 | Ni 0104 | 250 | 1.0 | 3 | 34 | 37 | 37 |

[1] 2,5-dimethylpiperazine.
[2] 2,5-dimethylpyrazine.
[3] Nickel (about 60%) on siliceous support, Universal Oil Products Co., Chicago, Illinois.
[4] Nickel (about 60%) on kieselguhr support, Harshaw Chemical Co., Cleveland, Ohio.

In the copending application of Donald E. Trucker, Serial No. 527,698, filed August 11, 1955, entitled "Method of Manufacturing Trans 2,5-Dimethylpiperazine," the invention disclosed and claimed is based on the discovery The Trucker application discloses that heating either pure cis or pure trans 2,5-dimethylpiperazine under identical conditions gives essentially the same mixture of cis and trans isomers, and that the isomerization reaction is an equilibrium reaction which can be represented mathematically as follows:

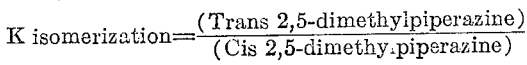
$$K \text{ isomerization} = \frac{(\text{Trans 2,5-dimethylpiperazine})}{(\text{Cis 2,5-dimethylpiperazine})}$$

The Trucker application further discloses that at temperatures in the range of 180–220° C. the equilibrium mixture obtained contains approximately 80–85% trans 2,5-dimethylpiperazine so that K isomerization is indicated to have a value of from about 4.0 to about 5.5. Finally, the Trucker application discloses that the isomerization reaction reaches an equilibrium which can be approached from either direction, i.e., by isomerizing either cis or trans 2,5-dimethylpiperazine or mixtures thereof.

The isomerization of cis or trans 2,5-dimethylpiperazine is carried out by heating the isomer or mixture of isomers with a nickel hydrogenation/dehydrogenation catalyst. The isomerization reaction proceeds in the absence of added hydrogen, such as by heating the isomer with the nickel catalyst in an atmosphere of nitrogen, but the isomerization reaction is desirably carried out in an atmosphere of added hydrogen under pressure.

The invention of Trucker of the isomerization of cis or trans 2,5-dimethylpiperazine to an equilibrium mixture of the two can be combined with my basic reaction of isopropanolamine to 2,5-dimethylpiperazine to provide recycle processes in which isopropanolamine is converted solely to trans 2,5-dimethylpiperazine or solely to cis 2,5-dimethylpiperazine. The combined recycle processes are regarded as an especially important feature of my invention because there is thus provided for the first time a commercially feasible way to product either trans or cis 2,5-dimethylpiperazine.

Figure 1:
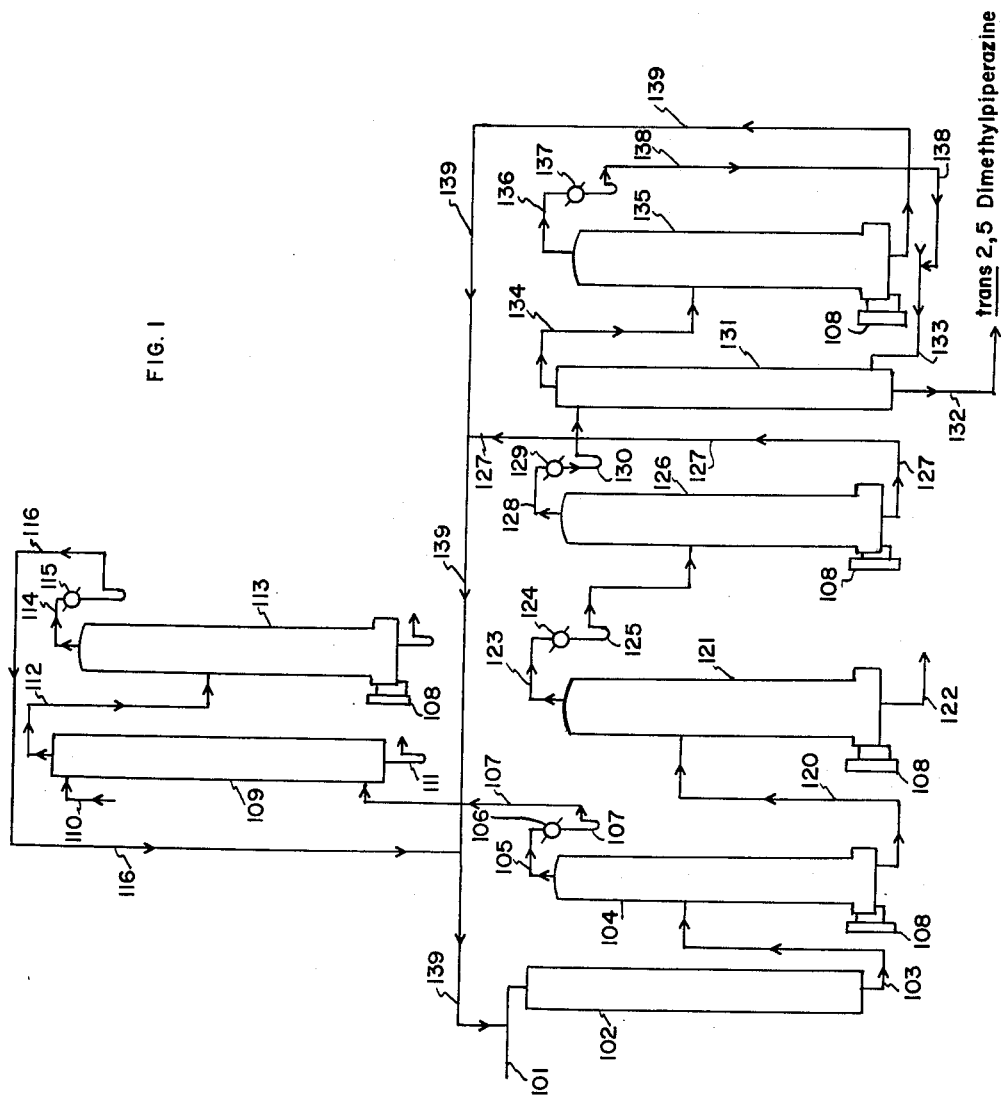

A preferred mode for synthesizing trans 2,5-dimethylpiperazine from isopropanolamine in a continuous process is illustrated diagrammatically in FIG. 1. Isopropanolamine is fed from line 101 into reactor 102 which is packed with a pelleted nickel catalyst. The reactor is maintained under conditions of high hydrogen pressure and high temperature such that essentially all of the isopropanolamine is converted to the desired products and by-products before being discharged through line 103 into stripping column 104.

Water and 2,5-dimethylpyrazine are removed from column 104 as overhead through line 105 condensed in condenser 106 and discharged into line 107. If the reaction mixture does not contain sufficient water to azeotropically remove all of the 2,5-dimethylpyrazine from the product, additional water is fed to the column by means not shown. Liquid in the pot of column 104, as well as columns 113, 121, 126 and 135 is heated by steam calandrias 108—108. The 2,5-dimethylpyrazine is fed from line 107 into dehydrating column 109 where it is dried by countercurrent washing with a strong caustic soda solution. The caustic solution enters the dehydrating column through line 110 and is discharged through line 111. The essentially dry 2,5-dimethylpyrazine is fed through line 112 into flash distillation column 113 and as removed as overhead through line 114, condensed in condenser 115 and recycled to reactor 102 through lines 116, 139 and 101.

The bottoms fraction from column 104 consisting of cis 2,5-dimethylpiperazine, trans 2,5-dimethylpiperazine and high boiling by-products is fed through line 120 into flash distillation column 121 where the high boiling by-products are removed as a bottoms fraction through line 122 and a mixture of cis 2,5-dimethylpiperazine and trans 2,5-dimethylpiperazine is removed as overhead through line 123, condensed in condenser 124 and fed through heated line 125 into a high efficiency distillation column 126. In column 126 the higher boiling cis 2,5-dimethylpiperazine is removed as a bottoms fraction and recycled to reactor 102 through lines 127, 139 and 101. The overhead removed through line 128 consists of trans 2,5-dimethylpiperazine of sufficient purity for many industrial purposes. Where the ultimate in purity is required, the overhead from line 128 is passed through condenser 129 and line 130 (both maintained appreciably above room temperature to prevent solidification of the trans 2,5-dimethylpiperazine) into a continuous crystallizer 131.

Due to the closeness of the boiling points of trans 2,5-dimethylpiperazine and cis 2,5-dimethylpiperazine, an effective separation by distillation is difficult to accomplish. Therefore an alternative to the above, not shown in the drawings involves the elimination of distillation column 126 and passing the mixture of cis and trans 2,5-dimethylpiperazine in line 125 directly into crystallizer 131.

The mixture consisting predominately of trans 2,5-dimethylpiperazine and containing a small quantity of cis 2,5-dimethylpiperazine is cooled in crystallizer 131 so that the trans 2,5-dimethylpiperazine solidifies and the crystals thereof are removed downwardly and eventually discharged into product line 132 by a screw mechanism not shown. A saturated aliphatic hydrocarbon such as heptane is introduced into the bottom of crystallizer 131 through line 133 and travels upwardly countercurrently to the crystals of trans 2,5-dimethylpiperazine thereby washing same and dissolving any cis 2,5-dimethylpiperazine adhering thereto. The trans isomer is much less soluble in such a hydrocarbon solvent than is the cis isomer and other aliphatic hydrocarbons can also be used, such as hexane and decane, as well as cycloparaffins such as cyclohexane, aromatics, such as benzene, and ketones, such as acetone. All of the cis 2,5-dimethylpiperazine entering crystallizer 131 remains in the liquid state and is dissolved in the heptane. The heptane solution containing cis 2,5-dimethylpiperazine is fed through line 134 into stripping column 135 in which the heptane is removed as overhead through line 136, condensed in condenser 137 and recycled to crystallizer 131 through lines 138 and 133.

Cis 2,5-dimethylpiperazine together with possibly a small percentage of trans 2,5-dimethylpiperazine is obtained as a bottoms fraction from column 135 and is recycled to reactor 102 through lines 139 and 101 so that essentially trans 2,5-dimethylpiperazine is obtained as the product of the process. As earlier noted 2,5-dimethylpyrazine is also recycled to reactor 102 through lines 116, 139 and 101. When recycled to the reaction zone, the 2,5-dimethylpyrazine is hydrogenated to form a mixture of cis and trans 2,5-dimethylpiperazine isomers.

Trans 2,5-dimethylpiperazine can be obtained as the sole product from isopropanolamine in recycle processes that are carried out batchwise rather than continuously as illustrated above. This procedure is illustrated in Examples XI and XII.

EXAMPLE XI

Isopropanolamine was converted solely to trans 2,5-dimethylpiperazine in a series of runs that were carried out as follows:

Twenty mols (1500 grams) of isopropanolamine and about 525 grams of a predominantly cis 2,5-dimethylpiperazine fraction from an earlier batch run of the same size were charged with 50 grams of Raney nickel catalyst into a one gallon stainless steel autoclave. The reaction mixture was heated for 4 hours at 220° C. under 1200 pounds hydrogen pressure to obtain a product consisting predominantly of 2,5-dimethylpiperazine. The product was filtered free of nickel catalyst and the 2,5-dimethylpiperazine fraction was isolated by distillation.

The distilled 2,5-dimethylpiperazine fraction was dissolved in 1.2 times its weight of heptane at 85—95° C. and the solution was then cooled to room temperature to obtain a precipitate of trans 2,5-dimethylpiperazine. The trans 2,5-dimethylpiperazine product was filtered and washed twice with heptane fractions weighing 0.4 times the weight of original 2,5-dimethylpiperazine fraction obtained in the reaction. The heptane solutions were combined and distilled to obtain a predominantly cis 2,5-dimethylpiperazine fraction which was combined with 20 mols of isopropanolamine and used in the next reaction. The average conversion of isopropanolamine to isolated trans 2,5-dimethylpiperazine was 68—70%.

Example XI illustrates a concurrent recycle process in which both isopropanolamine and a predominantly cis 2,5-dimethylpiperazine fraction are charged to the reactor. In contrast with this procedure, it is also possible to operate a recycle process on a periodic recycle basis. In this type of operation, the heptane soluble predominantly cis 2,5-dimethylpiperazine fraction obtained in the work up of the product is not recycled with fresh isopropanolamine, but is accumulated and directly isomerized to trans 2,5-dimethylpiperazine by heating with a nickel hydrogenation/dehydrogenation catalyst. This method of operation is illustrated by Example XII.

EXAMPLE XII

Part A

Two runs were made in each of which 2500 grams (33.3 mols) of isopropanolamine and 38 grams of Raney nickel catalyst were charged to a one gallon stainless steel autoclave and heated for 4 hours at 220° C. under 1200 pounds hydrogen pressure. Thereafter the reaction products were isolated and worked up as described in Example XI.

Part B

The predominantly cis 2,5-dimethylpiperazine fractions from Part A together with the cis 2,5-dimethylpiperazine fraction obtained from another isomerization run of the same size were charged to the autoclave with 50 grams of Raney nickel catalyst and heated for 4 hours at 210° C. under 1200 pounds hydrogen pressure. The reaction products were worked up as previously described.

The overall conversion of isopropanolamine to trans 2,5-dimethylpiperazine was approximately 70%.

The invention of Trucker, previously referred to, that trans 2,5-dimethylpiperazine can be isomerized to produce cis 2,5-dimethylpiperazine can also be combined with my process to provide a continuous process wherein isopropanolamine is converted to essentially the cis isomer of 2,5-dimethylpiperazine.

A preferred mode for synthesizing cis 2,5-dimethylpiperazine from isopropanolamine in a continuous process is illustrated diagrammatically in FIG. 2. Isopropanolamine is fed from line 1 into reactor 2 which is packed with a pelleted nickel catalyst. The reactor is maintained under hydrogen pressure and mild temperature conditions, i.e., less than 180° C. The reaction products are passed from reactor 2 through line 3 to a stripping column 4.

Water and 2,5-dimethylpyrazine are removed from column 4 as overhead through line 5, condensed in condenser 6 and discharged into line 7. If the reaction mixture does not contain sufficient water to azeotropically remove all of the 2,5-dimethylpyrazine from the product, additional water is fed to the column by means not shown. Liquid in the pot of column 4, as well as columns 13, 17, 28, 36, 47, 59, 66, 75 and 85 are heated by steam calandrias 8—8. The 2,5-dimethylpyrazine is fed from line 7 into dehydrating column 9 where it is dried by countercurrent washing with a strong caustic soda solution which enters column 9 from line 10 and is discharged through line 11. The essentially dry 2,5-dimethylpyrazine is fed through line 12 into flash distillation column 13 and is removed as overhead through line 14.

The 2,5-dimethylpyrazine overhead from line 14 is fed together with high pressure hydrogen from a source not shown through hydrogenator 15 where it is reduced to 2,5-dimethylpiperazine. The reaction mixture from hydrogenator 15 is fed through line 16 into stripping column 17. A small quantity of water is introduced into stripping column 17 through line 18 so as to form an azeotrope with any unreacted 2,5-dimethylpyrazine which is removed as overhead through line 19, condensed in condenser 20 and recycled to dehydrating column 9 through lines 21 and 7. The bottoms fraction from column 17 is fed through line 22 to an alumina packed drying column 23 and is then fed through line 24 into line 58. The further treatment of the crude hydrogenation mixture is subsequently described.

The bottoms fraction from column 4, which consists predominantly of isopropanolamine, cis 2,5-dimethylpiperazine, trans 2,5-dimethylpiperazine and high boiling by-products is fed through line 27 into fractionating column 28. Xylene from line 29 is fed into column 28 and forms an azeotrope with isopropanolamine which is removed as overhead through line 30. Upon being condensed and cooled in condenser 31, the isopropanolamine-xylene azeotrope is fed through line 32 into decanter 33 where it separates into two distinct phases, an upper phase consisting of approximately 96% xylene and 4% isopropanolamine and a lower phase consisting of approximately 80% isopropanolamine and 20% xylene. The upper phase which contains only 4% isopropanolamine is returned to column 28 through lines 34 and 29. The isopropanolamine rich lower phase from decanter 33 is fed through line 35 into fractionating column 36. All of the xylene is removed as an overhead isopropanolamine-azeotrope through line 37 and is fed into decanter 41 through condenser 38 and line 39. The upper phase from decanter 41 is returned to column 28 through lines 42, 34 and 29 and the lower phase from the decanter 41 is recycled to column 36 through lines 43 and 35. Xylene-free isopropanolamine is obtained as a bottoms fraction from column 36 and is returned to reactor 2 through lines 44 and 1.

The bottoms fraction from column 28 consisting of cis 2,5-dimethylpiperazine, trans 2,5-dimethylpiperazine and high boiling by-products is fed through line 46 into flash distillation column 47 where the high boiling by-products are removed as a bottoms fraction through line 48 and a mixture of cis 2,5-dimethylpiperazine and trans 2,5-dimethylpiperazine is removed as overhead through line 49 and fed into continuous crystallizer 52 through line 51. Condenser 50 and line 51 are both maintained appreciably above room temperature to prevent solidification of trans 2,5-dimethylpiperazine.

The mixture of cis 2,5-dimethylpiperazine and trans 2,5-dimethylpiperazine is cooled in crystallizer 52 so that the trans 2,5-dimethylpiperazine solidifies and the crystals thereof are moved downwardly and eventually discharged into line 53 by a screw mechanism not shown. Line 53 is heated so as to melt the trans 2,5-dimethylpiperazine which is transferred to isomerization column 56. A saturated aliphatic hydrocarbon such as heptane is introduced into the bottom of crystallizer 52 through line 54 and travels upwardly countercurrently to the crystals of trans 2,5-dimethylpiperazine thereby washing same and dissolving any cis 2,5-dimethylpiperazine adhering thereto. All of the cis 2,5-dimethylpiperazine entering crystallizer 52 remains in the liquid state and is dissolved in the saturated aliphatic hydrocarbon solvent. The heptane solution containing cis 2,5-dimethylpiperazine is fed through line 55 into stripping column 75.

Trans 2,5-dimethylpiperazine from line 53 is fed through isomerization column 56 which is packed with a pelleted nickel catalyst and heated so as to isomerize at least a portion of the trans 2,5-dimethylpiperazine to cis 2,5-dimethylpiperazine. The resulting mixture of cis 2,5-dimethylpiperazine and trans 2,5-dimethylpiperazine is fed through line 58 together with the mixture of cis 2,5-dimethylpiperazine and trans 2,5-dimethylpiperazine obtained by the hydrogenation of 2,5-dimethylpyrazine (from line 24) into stripping column 59 where any low boiling by-products obtained either in the hydrogenation of the 2,5-dimethylpyrazine or the isomerization of the trans 2,5-dimethylpiperazine are removed as overhead through line 60, condenser 61 and line 62. The bottoms fraction from column 59 is fed through line 65 into stripping column 66 where any high boiling by-products are removed as a bottoms fraction through line 67. A mixture of cis 2,5-dimethylpiperazine and trans 2,5-dimethylpiperazine is obtained as overhead through line 69 and is fed through condenser 69 and lines 70 and 51 into continuous crystallizer 52.

The heptane solution of enriched cis 2,5-dimethylpiperazine is fed from line 55 into stripping column 75 which is operated so as to distill most of the heptane as overhead through line 76 and this distillate is recycled to continuous crystallizer 52 through condenser 77 and lines 78 and 54. A bottoms fraction consisting of approximately 90% of enriched cis 2,5-dimethylpiperazine and 10% heptane is obtained from stripping column 75 and is fed through line 79 into crystallizer 80. Crystallizer 80 is maintained at a temperature of about 10° C. or lower so as to freeze the final traces of trans 2,5-dimethylpiperazine from the product and the crystals thereof are moved downwardly and discharged into line 81 by a screw mechanism not shown. Line 81 is heated to liquefy the crude trans 2,5-dimethylpiperazine which contains an appreciable quantity of cis 2,5-dimethylpiperazine and this mixture is recycled to crystallizer 52 through lines 81, 70 and 51.

Pure cis 2,5-dimethylpiperazine containing a small quantity of heptane is removed through line 84 and fed into flash distillation column 85 where the heptane is removed as overhead through line 86, condensed in condenser 87 and recycled to crystallizer 52 through lines 88, 78 and 54. Pure cis 2,5-dimethylpiperazine is obtained as a bottoms fraction from column 85 and is discharged through product line 89.

The principal difficulty in developing a continuous or recycle process for the production of cis 2,5-dimethylpiperazine is that the isomerization of trans 2,5-dimethylpiperazine to cis 2,5-dimethylpiperazine over nickel and hydrogenation of 2,5-dimethylpyrazine over nickel are both relatively inefficient and produce only a small quantity of the cis isomer. It is known that 2,5-dimethylpyrazine can be reduced to 2,5-dimethylpiperazine by chemical methods. The literature references do not indicate that the ratio of cis and trans isomers obtained in such chemical reductions, but there is reason to believe that at least some of these chemical methods are non-selective and will give a more favorable cis/trans ratio than is obtained by catalytic hydrogenation over nickel. In this event a more efficient recycle process could comprise the steps of dehydrogenating the trans 2,5-dimethylpiperazine to 2,5-dimethylpyrazine and then reducing the 2,5-dimethylpyrazine chemically. The resulting mixture of cis and trans 2,5-dimethylpiperazine would then be separated.

Of course it is not essential to carry out recycle cis 2,5-dimethylpiperazine processes continuously, as they can also be carried out batch-wise essentially as described in Examples XI and XII.

A review of the data contained in the examples hereinabove will show that the objectives of this invention have been accomplished. Thus, a process for the production of alkyl-substituted piperazines and alkyl-substituted pyrazines with consistently high conversions and yields has been provided. This process permits the production of such piperazines and pyrazines with conversions and yields which make commercial operations based on it feasible and which is in sharp contrast to the relatively low conversions obtained in the processes of the prior art. The central and characteristic feature of the method of my invention is the reaction of the defined alkanolamine with heat in the presence of a nickel or cobalt hydrogenation/dehydrogenation catalyst and my method is further characterized by the fact that a diluent or solvent is not required, although such can be used, which diluent or solvent was used in certain of the prior art methods for making such compounds. Furthermore, it has been shown that, under the proper conditions of temperature, pressure, catalyst concentration and reaction time, the method of the invention can be carried out to produce over 50% of the trans isomer of 2,5-dimethylpiperazine when isopropanolamine is employed as the alkanolamine starting material.

Broadly speaking, my invention resides in a method for preparing alkyl-substituted piperazines, alkyl-substituted pyrazines and mixtures of said piperazine and pyrazine, which comprises heating the defined alkanolamine in the presence of a nickel or cobalt hydrogenation/dehydrogenation catalyst.

I claim:

1. A method for preparing alkyl-substituted piperazines, alkyl-substituted pyrazines, and mixtures of said piperazines and pyrazines which comprises, vaporizing an alkanolamine selected from the group consisting of alkanolamines corresponding to the formula

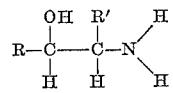

and mixtures thereof, wherein R is a lower alkyl radical and wherein R' is selected from the group consisting of hydrogen and a lower alkyl radical, heating the vaporized alkanolamine and passing the heated alkanolamine over a catalyst selected from the group consisting of nickel and cobalt hydrogenation/dehydrogenation catalysts under conditions of temperature and pressure so as to maintain said alkanolamine in vapor phase.

2. A method in accordance with claim 1 wherein said alkanolamine is isopropanolamine and said catalyst is an alloy skeletal nickel hydrogenation/dehydrogenation catalyst.

3. A method in accordance with claim 1 wherein said alkanolamine is isopropanolamine and said catalyst is an alloy skeletal cobalt hydrogenation/dehydrogenation catalyst.

4. A method in accordance with claim 1 wherein said alkanolamine is 1-amino-2-hydroxybutane and said catalyst is an alloy skeletal nickel hydrogenation/dehydrogenation catalyst.

5. A method in accordance with claim 1 wherein said alkanolamine is 1-amino-2-hydroxybutane and said catalyst is an alloy skeletal cobalt hydrogenation/dehydrogenation catalyst.

6. A method in accordance with claim 1 wherein said alkanolamine is 3-amino-2-butanol and said catalyst is an alloy skeletal nickel hydrogenation/dehydrogenation catalyst.

7. A method in accordance with claim 1 wherein said alkanolamine is 3-amino-2-butanol and said catalyst is an alloy skeletal cobalt hydrogenation/dehydrogenation catalyst.

8. A method for preparing 2,5-dimethylpyrazine which comprises heating isopropanolamine in the presence of a nickel dehydrogenation catalyst in the vapor phase at a temperature within the range of about 175° C. to 400° C.

References Cited in the file of this patent

McElvain et al., J. Am. Chem. Soc., volume 76, 1126–1137 (1954).

UNITED STATES PATENT OFFICE
CERTIFICATE OF CORRECTION

Patent No. 3,067,199                      December 4, 1962

William K. Langdon

It is hereby certified that error appears in the above numbered patent requiring correction and that the said Letters Patent should read as corrected below.

Column 2, line 7, for "are" read -- art --; column 4, line 73, for "mehod" read -- method --; column 6, line 7, for "uesd" read -- used --; column 7, line 1, for "concentrations" read -- concentration --; lines 62 and 63, after "subatmospheric" insert -- , atmospheric --; column 9, line 69, before "hydrogen" insert -- with --; line 70, for "autogeneously" read -- autogenously --; columns 9 and 10, Table 1, footnote 2 thereof, for "2,5-dimesylpyrazine." read -- 2,5-dimethylpyrazine. --; column 10, line 73, for "Podielniak-type" read -- Podbielniak-type --; columns 11 and 12, in the heading to Table 2, for "Isopropanoline-Raney" read -- Isopropanolamine-Raney --; column 13, line 48, before "trans" insert -- the --; line 73, for "of", second occurrence, read -- to --; column 15, line 5, for "helic-packed" read -- helice-packed --; columns 17 and 18, Table 7, third column, under the heading "Conversion of IPA,1 percent to-", for "DMP-DMPy" read -- DMP+DMPy --; column 21, line 30, for "espeically" read -- especially --; line 32, for "product" read -- produce --; same column 21, line 59, for "as", first occurrence, read -- is --; column 26, line 9, for "inventi n" read -- invention --.

Signed and sealed this 22nd day of October 1963.

(SEAL)
Attest:

ERNEST W. SWIDER
Attesting Officer

EDWIN L. REYNOLDS
Acting Commissioner of Patents